United States Patent [19]

de Keizer

[11] 4,390,942

[45] Jun. 28, 1983

[54] CONTROL SYSTEM

[75] Inventor: Cornelis de Keizer, Dordrecht, Netherlands

[73] Assignee: IHC Holland N.V., Papendrecht, Netherlands

[21] Appl. No.: 197,536

[22] Filed: Oct. 16, 1980

[30] Foreign Application Priority Data

Oct. 19, 1979 [NL] Netherlands .......................... 7907723

[51] Int. Cl.³ ........................ G05B 11/42; G06G 7/66
[52] U.S. Cl. .................................... 364/162; 318/610; 364/180
[58] Field of Search ............... 364/160, 161, 162, 163, 364/180, 181, 166, 172; 318/561, 590, 591, 609, 610; 328/69, 71; 330/1 A

[56] References Cited

U.S. PATENT DOCUMENTS

| | | | |
|---|---|---|---|
| 3,662,276 | 5/1972 | Hyer | 318/591 |
| 3,772,602 | 11/1973 | Kobayashi | 318/591 |
| 3,790,765 | 2/1974 | Morrison | 364/161 X |
| 3,796,944 | 3/1974 | Bur | 328/69 |
| 4,059,745 | 11/1977 | Gaertner | 364/180 X |
| 4,236,202 | 11/1980 | Giles et al. | 364/161 |
| 4,268,784 | 5/1981 | Ganaway | 364/162 X |

FOREIGN PATENT DOCUMENTS 7701257  8/1978  Netherlands .......................... 364/162

OTHER PUBLICATIONS

Control Engineering, vol. 25, No. 2, Feb. 1978, pp. 63–65, "Integral-Tracking Override is Better than Output-Tracking".
Control Engineering vol. 16, No. 8, Aug. 1969, pp. 71 and 74, A Trend Report "Electronic Process Controllers".

Primary Examiner—Joseph F. Ruggiero
Attorney, Agent, or Firm—Young & Thompson

[57] ABSTRACT

A control system for controlling the variables of a process, comprising at least two proportional-integral-differential controllers each comprising a linear signal path, a differentiating signal path and an integrating signal path, all connected to an input junction. The outputs of the linear signal path and the differentiating signal path are added at an intermediate junction and the resulting sum signal is added to the output signal of the integrating signal path at an output junction. Each proportional-integral-differential controller supplies an output suitable for controlling one of the process variables such that this process variable is maintained as close as possible to a predetermined maximum value without any of the other process variables exceeding its respective predetermined maximum value. The difference between the value of each of the process variables and the maximum value applying to each of the respective process variables is supplied to a separate proportional-integral-differential controller assigned to the associated process variable. The outputs of all controllers are supplied to a comparator circuit which delivers the smallest of these signals through feedback signal paths to a difference junction in each controller. The difference is formed as a difference signal between the comparator output and sum signal at the intermediate junction in the associated controller, and this difference signal is periodically sampled and used for periodically resetting the integrating circuit in the integrating signal path in each controller.

1 Claim, 3 Drawing Figures

CONTROL SYSTEM

The invention relates to a control system comprising at least a proportional-integral-differential-control circuit consisting of a linear signal path, a differentiating signal path and an integrating signal path, all paths running from an input junction, whereby the output signals of the linear signal path and the differentiating signal path are added in an intermediate junction and the resulting sum signal is added to the output signal of the integrating signal path in an output junction, which proportional-integral-differential control circuit supplies an output signal to a process to control one of the process variables such that said process variable is set as closely as possible to a predetermined maximum value without the other process variables exceeding their respective predetermined maximum values.

Proportional-integral-differential control circuits, shortly denoted as PID-controllers, are known themselves and are used in numerous control systems. In many control systems the changing of a control signal for one of the process variables of the process, which is controlled by the control system, has also influence onto a great number of other process variables. Problems are encountered when several process variables which are influenced by a control system, on the one hand may not exceed a predetermined threshold value and on the other hand should be set preferably as closely as possible to this threshold value. In such a case it may easily happen that by varying one of the process variables a number of other process variables is influenced such, that the maximum values assigned to said other process variables are exceeded.

Such a problem is for example encountered in a dredging ship, equipped with a suction dredge, whereby the dredging process is controlled by a control circuit. In such a dredging process the following process variables should be taken into account:

$X_1$: the hauling speed, that means the speed of rotation of the hauling hauling winch.

$X_2$: the concentration of the dredged mixture.

$X_3$: the load of the cutter.

$X_4$: the load of the side winch.

$X_5$: the vacuum of the suction pump.

$-X_6$: the velocity of the dredged mixture.

All said process variables may not exceed certain thresholds. The hauling speed $X_1$ may not exceed a predetermined value $X_{1-max}$. The concentration of the dredged mixture $X_2$ may not exceed a predetermined value $X_{2-max}$. The load of the cutter $X_3$ may not exceed a predetermined value $X_{3-max}$. The side winch load $X_4$ may not exceed the predetermined value $X_{4-max}$. The vacuum of the suction pump may not exceed the value $X_{5-max}$. The velocity of the mixture $-X_6$ may not drop under $-X_{6-max}$, which means that $X_6$ may not exceed the value of $X_{6-max}$.

In general the following formula applies for the different process variables:

$$X_i \leq X_{i-max}, i=1\ldots n \quad (1)$$

The process will be carried out in an optimum way in the theoretical situation that each process variable is set exactly at its maximum value. This means for the practical situation that it should be attempted to set as many process variables as possible onto their maximum value without exceeding these maximum values, whereby the other process variables should approximate their maximum values as closely as possible. For one or more of the process variables the following formula should apply:

$$X_j = K_{j-max} \quad 1 \leq j \leq n \quad (2)$$

Controlled processes satisfying those formulae (1) and (2) are already known.

In FIG. 1 for example a system is illustrated comprising a PID-controller supplying a control signal U to a process for influencing one of the process variables $X_1 \ldots X_n$. Each of the process variables $X_1 \ldots X_n$ is compared with a maximum value $X_{1-max} \ldots X_{n-max}$, predetermined for each of said variables, and the resulting difference signals are supplied to a comparator, for choosing the minimum difference value out of the difference values $E_1 \ldots E_n$ and supplying said minimum value to the PID-controller. The PID-controller supplies a control signal U for influencing the process variable, corresponding to said determined minimum difference value. If said process variable now is changed then in general also all the other process variables will be changed. If at a certain moment the comparator determines that the difference signal corresponding to another process variable is the minimum signal, then said difference signal is supplied to the PID-controller which is as a result thereof supplying an output signal U to the process to influence now the corresponding other process variable. The disadvantage of such a control system is, that at the conversion from the one regulating process variable to the other in general disturbing transient phenomena will appear.

FIG. 2 illustrates another control system in which a PID-controller supplies an output signal U to a process to influence each of the process variables in said process. Beforehand one of the process variables, for instance $X_1$, is chosen as regulating variable. The difference between $X_1$ and the predetermined maximum value $X_{1-max}$ corresponding to said variable, the difference signal $E_1$, is supplied to the PID-controller, which controller will try to supply such a control signal U that the difference $E_1$ will be as small as possible. All the other process variables $X_2 \ldots X_n$ are compared with predetermined maximum values $X_{2-max} \ldots X_{n-max}$. As long as each of said variables $X_2 \ldots X_n$ is smaller than the corresponding maximum, which means as long as $X_{i-max} - X_i \leq 0$ none of said variables will have any influence onto the controlled process.

If however one of said variables $X_2 \ldots X_n$, for instance $X_i$ will exceed the corresponding maximum value $X_{i-max}$, then a negative difference signal $E_i$ will appear. This negative difference signal $E_i$ now will be added to the difference signal $E_1$ and the resulting sum signal is supplied to the PID-controller. However, because $E_1$ may be positive it is possible that the resulting sum signal, notwithstanding the addition of the negative difference signal $E_i$ still will be a positive signal, so that the output signal U of the PID-controller is not or not sufficiently changed to create a situation in which $X_i$ will fall below the corresponding predetermined maximum value $X_{i-max}$.

To avoid this problem the values $E_2 \ldots E_n$ are often amplified to increase the influence thereof. However this has the disadvantage tht the control of the process will be less stable. It is further possible to integrate the error signal $E_i$, which becomes negative and therefore has influence on the control, so that the influence thereof is increases with time. The disadvantage thereof is that this solution results to a slow control.

It is now an object of the invention to provide a control system in which the above mentioned formulae (1) and (2) are satisfied and in which also the disadvantages of the known systems are removed.

To satisfy said object the invention provides a control system of the type, described in the beginning, characterized in that the difference between the value of each of the process variables and the maximum value corresponding to said respective process variable is supplied to a separate proportional-integral-differential control circuit asigned to each of the process variables separately, whereby the output signals of each of said control circuits are supplied to a comparator circuit which delivers the smallest of said signals through feed back paths back to a difference junction allocated in each of the control circuits, in which the difference is formed between the comparator output signal and the above mentioned sum signal at the intermediate junction in the related control circuit, which difference signal is used to reset the integrator in the integrating signal path of each of the control circuits.

The invention will now be explained in more detail relating to the accompanying figures.

Figure 1:
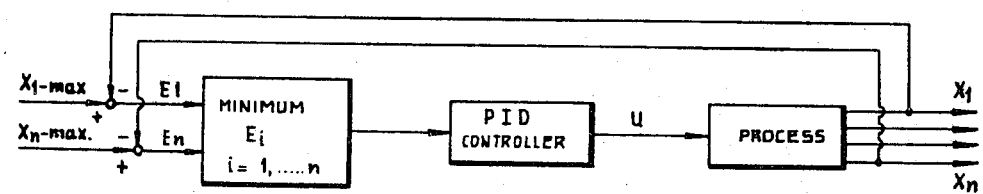
FIG. 1 illustrates a prior art control system.
Figure 2:
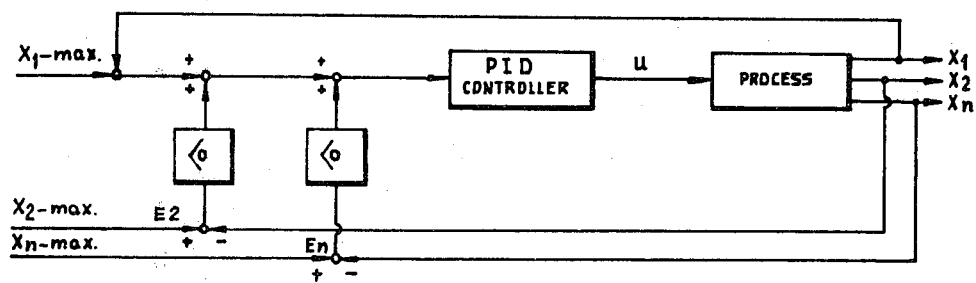
FIG. 2 illustrates another prior art control system.
Figure 3:
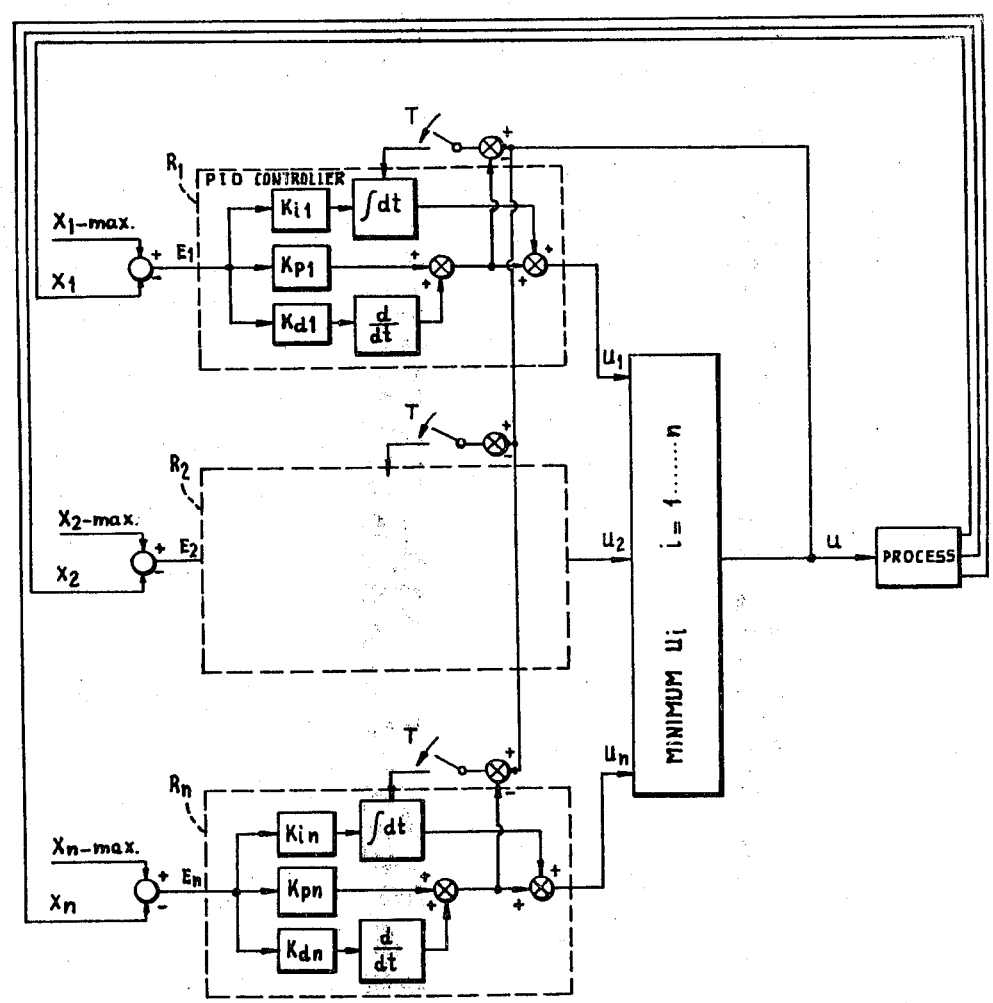
FIG. 3 illustrates a control system according to the invention.

In FIG. 3 the control system according to the invention is illustrated comprising a number of proportional-integral-differential control circuits $R_1 \ldots R_n$, in the following shortly denoted as PID-control circuits. An input signal $E_1 \ldots E_n$ is supplied to each of said control circuits, which input signal is formed as the difference between a signal $X_1 \ldots X_n$ corresponding to one of the real process variables and the maximum values $X_{1-max} \ldots X_{n-max}$ corresponding each to one of said different process variables. In each control circuit the related input signal $E_1 \ldots E_n$ is supplied to an integrating signal path, a linear signal path and a differentiating signal path, the amplification factors of which are defined respectively by $K_{i1} \ldots K_{in}$, $K_{p1} \ldots K_{pn}$ and $K_{d1} \ldots K_{dn}$. The output signal of the linear signal path is added to the output signal of the differentiating signal path and thereafter the sum signal is added to the output signal of the integrating signal path, resulting in the output signal of the concerned control circuit. All the output signals $U_1 \ldots U_n$ are supplied to a comparator circuit transferring only the smallest signal of said output signals $U_1 \ldots U_n$ to its output. On the one hand said output signal U will be delivered as control signal to the process to control therein the process variable corresponding to said control signal and on the other hand said output signal is fed back to each of the control circuits in which the difference is formed between said output signal and the sum signal at the junction at the end of the linear signal path and the end of the differentiating signal path in each of said control circuits. Each of said difference signals is now used in the related control circuit to reset the integrator in the integrating signal path, that means that the output signal of said integrator is made equal to the related difference signal.

If said output signal U changes, then the related process variables will be changed and therefore also the corresponding input signals $X_1 \ldots X_n$ will be changed. For each of said input signals $X_1 \ldots X_n$ said input signal should be chosen below the corresponding maximum value $X_{1-max} \ldots X_{n-max}$, but also said input signals should approximate the corresponding maximum value as closely as possible. It is now possible to choose said control signal U such that for one or more of the process variables it applies that:

$$X_j = X_{j-max} \quad 1 \leq j \leq n$$

If now during the operation of the control system the comparator chooses one of the control signals $U_1 \ldots U_n$ as the smallest signal then this signal will influence the corresponding process variable, which is then the so called regulating process variable and the corresponding proportional-integral-differential control circuit will try to set said process variable equal to its maximum value. If for instance the comparator chooses $U_1$ as control signal to deliver at its output, then this means that all the other output signals of the control circuits $U_2 \ldots U_n$ do not have any influence on the control system. However, because a difference signal $E_2 \ldots E_n$ is still supplied to the inputs of each of the other control circuits, the integrating action in each of the control circuits will result in output signals $U_2 \ldots U_n$, which are wrongly increasing. To prevent this the output signal U is fed back as illustrated to each of the control circuits. In each of the control circuits the difference is formed between the output signal U and the sum of the output signals of the linear and differentiating path in the control circuit. Said difference signal is now used to reset all the integrating functions by making said integrating function in each of the control circuits equal to the corresponding difference signal with the result, that the output signals of the PID-control circuits directly after the reset action are all equal to the output signal of the regulating PID-control circuit, that means the control circuit which was delivering the regulating output signal U directly before the reset moment. The reset action for each of the integrators is repeated every T seconds by making the value of the integrator equal to U (=the minimum value of the values $U_1 \ldots U_n$) reduced by the outputs of the linear and differentiating signal paths of the concerned control circuit, so that the outputs $U_1 \ldots U_n$ are all equal directly after the reset action.

By means of this control system on the one hand the fact is achieved that none of the process variables is exceeding its maximum value, whereas at the same time one or more of the process variables equals its maximum value or approaches said maximum value very closely. On the other hand the advantage is attained that the comparator may choose another of the output signals $U_1 \ldots U_n$ as regulating control signal without transient phenomena because all the controllers are so to speak constantly "following".

Up to now it is assumed that each of the process variables should be smaller than or at least equal to the corresponding maximum value. It is however also possible that one or more of the process variables should be maintained greater than or equal to a minimum value, that means $X_m \geq X_{m-min}$ (instead of $X_m \leq X_{m-max}$). If the concerned process variable $X_m$ is increasing with decreasing control signal U, then it is also possible to treat this process variable $X_m$ in the described control system by translating the above mentioned inequality relation into:

$$-X_m \leq -X_{m-min}$$

or $$-X_m \leq X_{max} (=X_{m-min}).$$

The related PID-controller for this process variable $X_m$ should therefore receive an error signal $$E_m = -X_{m-min} - (-X_m)$$

or $$E_m = X_m - X_{m-min}$$

(instead of $E_m = X_{m-max} - X_m$).

I claim:

1. Control system for controlling the variables of a process, comprising at least two proportional-integral-differential controllers each comprising a linear signal path, a differentiating signal path and an integrating signal path, all connected to an input junction, the outputs of the linear signal path and the differentiating signal path being added at an intermediate junction and the resulting sum signal is added to the output signal of the integrating signal path at an output junction, each proportional-integral-differential controller supplying an output suitable for controlling one of the process variables such that said process variable is maintained as close as possible to a predetermined maximum value without any of the other process variables exceeding its respective predetermined maximum value, the difference between the value of each of the process variables and the maximum value applying to each of said respective process variables being supplied to a separate proportional-integral-differential controller assigned to the associated process variable, the outputs of all controllers being supplied to a comparator circuit, which comparator circuit delivers the smallest of these signals through feedback signal paths to a difference junction in each controller, the difference being formed as a difference signal between the comparator output and said sum signal at the said intermediate junction in the associated controller, and means whereby said difference signal is periodically sampled and used for periodically resetting the integrating circuit in the integrating signal path in each controller.

* * * * *